US009783102B2

(12) United States Patent
Salter et al.

(10) Patent No.: US 9,783,102 B2
(45) Date of Patent: Oct. 10, 2017

(54) INDUCTIVELY COUPLED BIN LIGHT

(71) Applicant: FORD GLOBAL TECHNOLOGIES, LLC, Dearborn, MI (US)

(72) Inventors: Stuart C. Salter, White Lake, MI (US); Ali Ammar, Dearborn, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 14/595,769

(22) Filed: Jan. 13, 2015

(65) Prior Publication Data
US 2016/0200244 A1 Jul. 14, 2016

(51) Int. Cl.
*B60Q 3/02* (2006.01)
*B60R 7/04* (2006.01)
(Continued)

(52) U.S. Cl.
CPC ........... *B60Q 3/0293* (2013.01); *B60Q 3/225* (2017.02); *B60Q 3/80* (2017.02); *B60R 7/04* (2013.01);
(Continued)

(58) Field of Classification Search
CPC ............ H02J 5/005; H02J 50/10; H02J 50/12; H02J 17/00; H02J 50/20–50/27; B60Q 3/022;
(Continued)

(56) References Cited

U.S. PATENT DOCUMENTS 4,202,030 A * 5/1980 Kimura ................. B60Q 3/007
362/144
4,577,262 A * 3/1986 Buteaux .................... B63C 9/22
200/60
(Continued)

FOREIGN PATENT DOCUMENTS

CN 203704517 U 7/2014
JP 2006339044 A 12/2006
(Continued)

OTHER PUBLICATIONS

Dictioanry definition of switch, retrieved Mar. 3, 2017 from Dictionary.com.*
(Continued)

*Primary Examiner* — Anh Mai
*Assistant Examiner* — Steven Horikoshi
(74) *Attorney, Agent, or Firm* — Vichit Chea; King & Schickli, PLLC

(57) ABSTRACT

A storage bin for a motor vehicle includes a storage bin storage compartment and a storage bin lid hingedly connected to the storage compartment. The lid includes a light source disposed to illuminate an interior of the storage compartment. A transmitter and a receiver are provided for providing an electrical current to the hinged storage bin light source. The transmitter is a first coil disposed in a first portion of a pivoting hinge assembly of the storage bin and the receiver is a second coil disposed in a second portion of the pivoting hinge assembly, the second coil electrically communicating with the light source. In use, a current is supplied to the light source when the transmitter and receiver are disposed adjacent to one another by pivoting the storage bin lid to an open configuration.

19 Claims, 4 Drawing Sheets

(51) Int. Cl.
*B60R 13/08* (2006.01)
*B60Q 3/225* (2017.01)
*B60Q 3/80* (2017.01)
*B60R 11/00* (2006.01)

(52) U.S. Cl.
CPC ... B60R 13/0838 (2013.01); *B60R 2011/0094* (2013.01)

(58) Field of Classification Search
CPC ....... B60Q 3/0293; H01H 21/04–21/10; B60C 3/225; B60C 3/30; B60C 3/35; B60C 3/76; B60C 3/80–3/88; B60R 7/04; B60R 7/087; B60R 7/088; B60R 2011/0007; B60R 2011/0094
See application file for complete search history.

(56) References Cited

U.S. PATENT DOCUMENTS

| | | | |
|---|---|---|---|
| 6,254,251 B1 * | 7/2001 | Washington | B25H 3/02 362/154 |
| 7,126,450 B2 | 10/2006 | Baarman et al. | |
| 7,646,279 B2 | 1/2010 | Limpkin et al. | |
| 2012/0140440 A1 | 6/2012 | Dam et al. | |
| 2012/0242165 A1 * | 9/2012 | Herglotz | E05D 11/0081 307/104 |

FOREIGN PATENT DOCUMENTS

| | | |
|---|---|---|
| WO | 2009079209 A1 | 6/2009 |
| WO | 2014031627 A1 | 2/2014 |

OTHER PUBLICATIONS

English translation of CN203704517.
English translation of JP2006339044.
English translation of TH65026A published Nov. 18, 2004 to Access Business Group International LLC.

* cited by examiner

INDUCTIVELY COUPLED BIN LIGHT

TECHNICAL FIELD

This disclosure relates generally to motor vehicle storage bins, and more particularly to a motor vehicle storage bin including an interior lighting system powered by inductive coupling.

BACKGROUND

With reference to FIG. 1, it is known to provide a storage compartment assembly 10, for example in an automotive console, typically including a storage compartment 12, a storage compartment lid 14, and a hinge mechanism 16 connecting the two. At a high level, a typical hinge includes wings 17, a central pivoting portion 18 colloquially known as a "knuckle," and a hinge pin (not shown) hingedly connecting the two to allow pivoting the lid 14 from a closed to an open configuration. Often a light source 19 is included, disposed to allow illumination of the interior of the storage compartment 12 for the motor vehicle operator and/or passenger's convenience.

A light source requires a source of electrical current for operation, and also a means for supplying and discontinuing the electrical current to the light source, to turn the light on and off as desired. In a motor vehicle, it is most common to provide an electrical current hard-wired to the light, since a battery or other self-contained power source which requires replacement is inconvenient to the user. However, particularly in the situation of an interior light 19 for a storage compartment, due to limitations of space it can be a challenge to properly route wiring to supply electrical current to a light source 19 without interfering with other systems. Likewise, placement of a switch or other means for activating light source 19 can be a challenge in terms of available space. Also, in a motor vehicle it can be a distraction to the operator to have to manually activate light source 19. Still more, inclusion of these features presents additional challenges of cost of design and parts to the manufacturer.

To solve these and other problems, the present disclosure relates to a motor vehicle storage bin including an interior lighting system powered by inductive coupling. Advantageously, the described devices and systems provide interior lighting for the storage bin without requiring actuator switches or other means for actuating the interior lighting, and necessitating minimal hardware and wiring.

SUMMARY

In accordance with the purposes and benefits described herein, in one aspect a storage bin for a motor vehicle is provided including a storage bin storage compartment. A storage bin lid is hingedly connected to the storage compartment and includes a light source disposed to illuminate an interior of the storage compartment. Still further, a transmitter and a receiver for providing an electrical current to the hinged storage bin light source are provided. In embodiments, the transmitter is a first coil disposed in a first portion of a pivoting hinge assembly of the storage bin and the receiver is a second coil disposed in a second portion of the pivoting hinge assembly. The second coil is placed in electrical communication with the light source.

A current is supplied to the light source when the transmitter and receiver are disposed adjacent to one another by pivoting the storage bin lid to an open configuration. The current may be supplied to the light source by an inductive coupling process when the storage bin lid is pivoted to place the transmitter and receiver adjacent to one another. In embodiments, the current is supplied to the light source when the transmitter and receiver are placed within approximately 5 mm one from the other. To avoid any need for complicated detection mechanisms to determine when the transmitter and receiver are adjacent to one another, an electrical current pulse is automatically provided by the transmitter at a predetermined time interval. When the transmitter and receiver are not adjacent to one another, the pulse has no effect. When the transmitter and receiver are adjacent to one another, an electrical current is supplied to the light source.

In another aspect, a method is described for supplying an electrical current to an interior light of a storage bin for a motor vehicle, including steps of providing a transmitter disposed in a first portion of a hinge assembly of the storage bin and providing a receiver disposed in a second portion of the hinge assembly of the storage bin. Next, the storage bin lid is pivoted from a closed to an open configuration, whereby a current is supplied from the transmitter to the receiver. In embodiments, the current is supplied by an inductive coupling process by disposing the transmitter adjacent to the receiver by pivoting the storage bin lid to the open configuration. A step of automatically providing an electrical current pulse from the transmitter at a predetermined time interval may be included, to remove any need for complex detection mechanisms to determine when the transmitter and receiver are adjacent to one another.

In yet another aspect, a lighted console subassembly including an armrest is provided for a motor vehicle, including the storage bin as described above.

In the following description, there are shown and described embodiments of the disclosed motor vehicle storage bin with inductively coupled lighting system. As it should be realized, the structure is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle storage bin with inductively coupled lighting system, and together with the description serve to explain certain principles thereof. In the drawing.

Reference will now be made in detail to embodiments of the disclosed motor vehicle storage bin with inductively coupled lighting system, examples of which are illustrated in the accompanying drawing figures.

DETAILED DESCRIPTION

Figure 1:
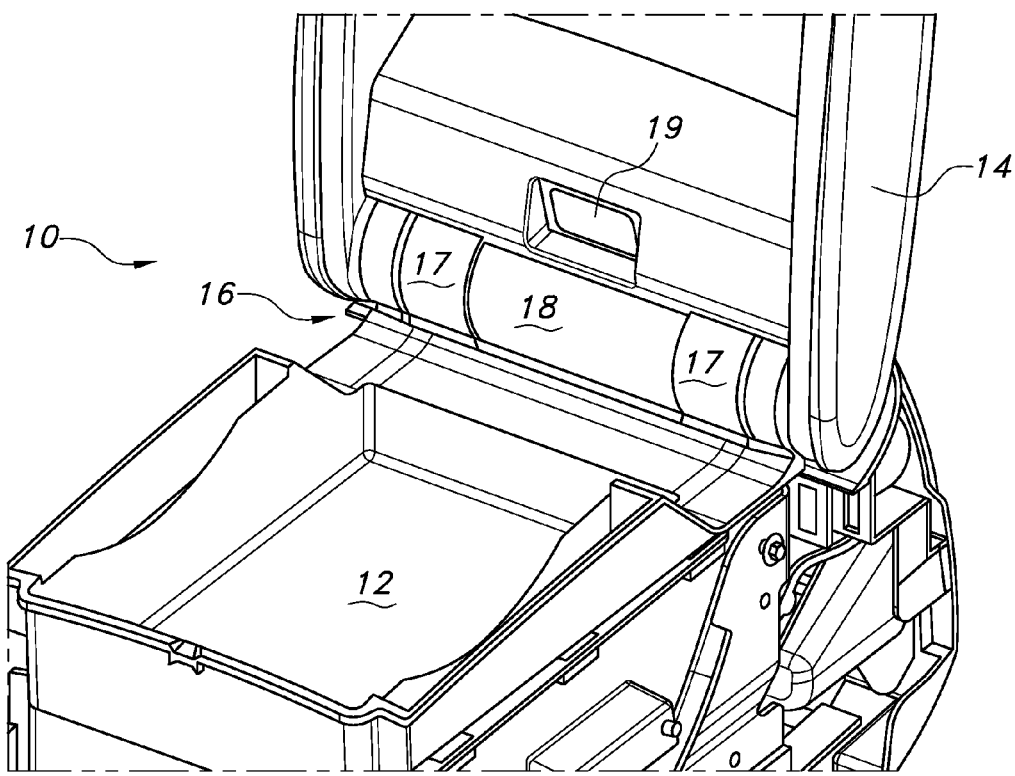
FIG. 1 depicts a motor vehicle console storage bin and hinged lid, including an interior light associated with the hinged lid.
Figure 2:
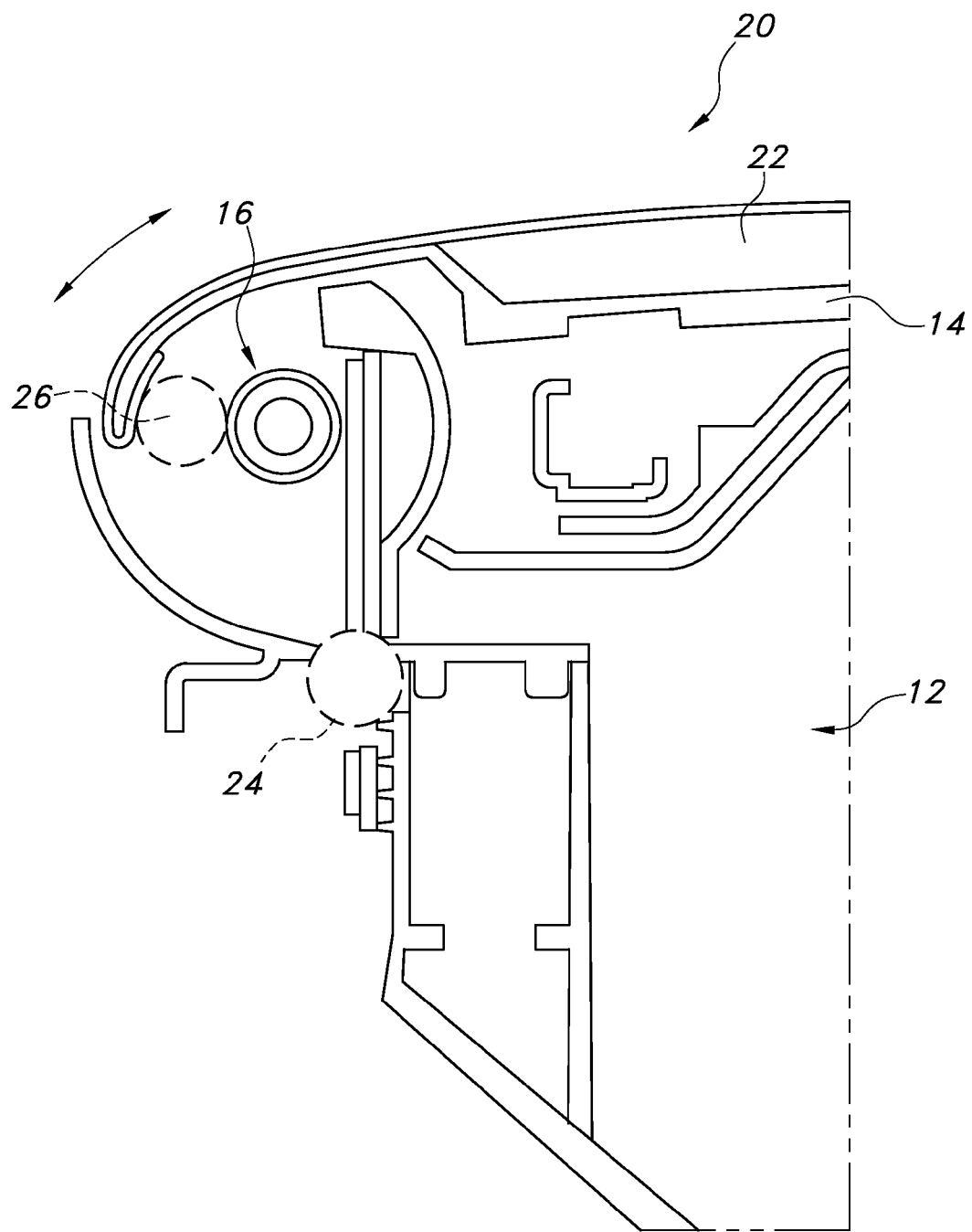
FIG. 2 depicts a side view of a motor vehicle console storage bin and hinged lid according to the present disclosure.

To address the above-discussed issues, the present disclosure relates to a motor vehicle storage bin 20 including an inductively coupled lighting system. With reference to FIG. 2, the storage bin 20 includes a storage compartment 12, a hinged lid 14, and a pivoting hinge structure 16 hingedly connecting the two. The hinged lid 14 may include a top-mounted armrest assembly 22 having various configurations known in the art.

Figure 4:
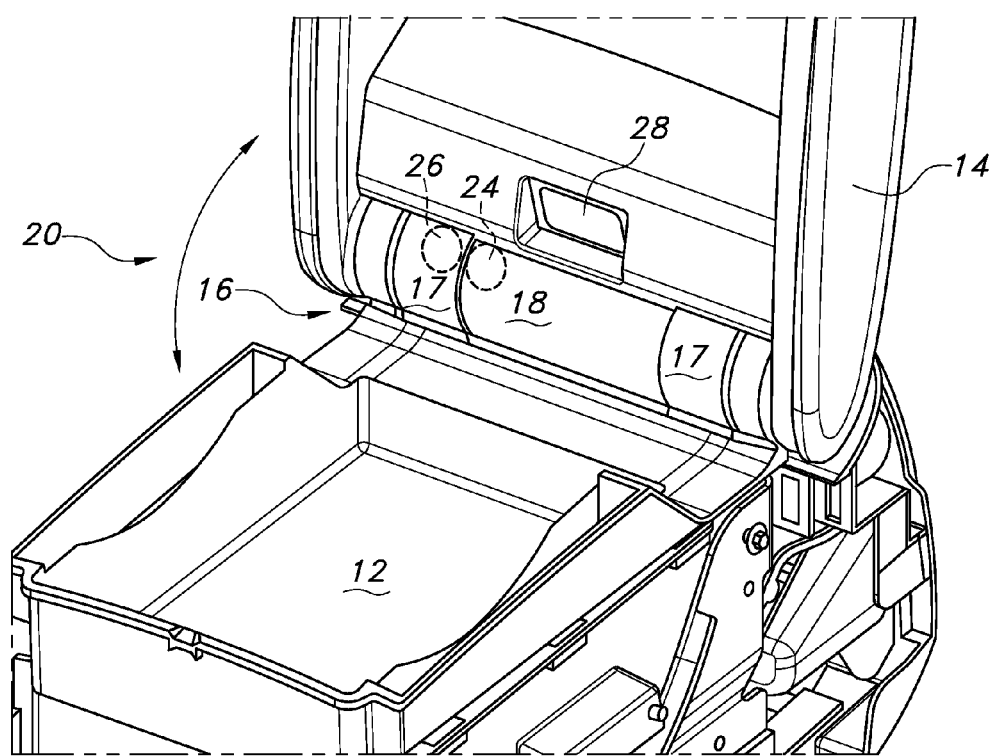
FIG. 4 depicts a motor vehicle console storage bin and hinged lid according to the present disclosure, including inductively coupled transmitter and receiver coils disposed adjacent to one another to supply a current to the interior light associated with the hinged lid.

Disposed within elements of the pivoting hinge 16 are a transmitter 24 and a receiver 26 for supplying an electrical current to a light source 28 (see FIG. 4) for providing light to an interior of the storage compartment 12. It will be appreciated that in alternative embodiments the positions of the transmitter 24 and receiver 26 may be rotated 90 degrees, i.e., reversed relative to one another, and still accomplish the same purpose as described below. Transmitter 24 is wired to a source of electrical current, typically the electrical system of the motor vehicle. Receiver 26 is wired to the light source 28 (see FIG. 4), which may be any suitable light source. In an embodiment, an LED light source is used for its convenient features of relatively cool operating temperature and long life. However, other light types are contemplated for use herein.

Figure 3:
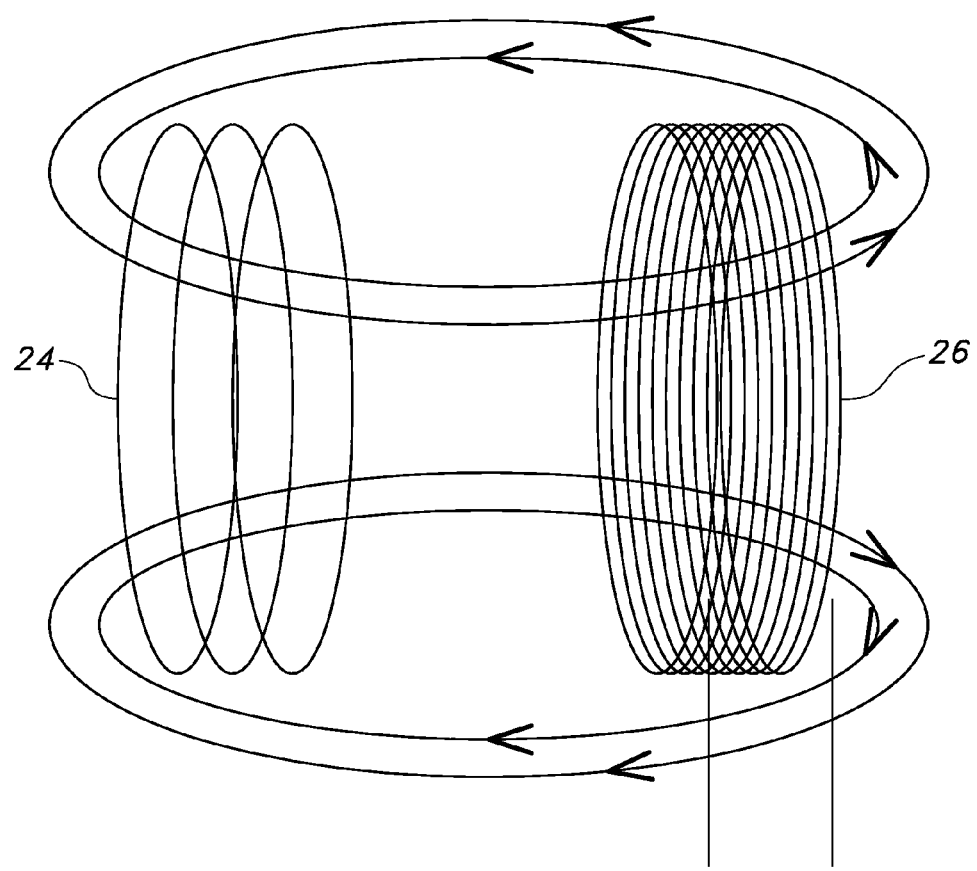
FIG. 3 schematically depicts inductively coupled transmitter and receiver coils for providing current to a storage bin interior light according to the present disclosure.

In an embodiment, transmitter 24 and receiver 26 form an inductively coupled system. That is, transmitter 24 is a transmitting coil, and receiver 26 is a receiving coil (see FIG. 3). As is known, in inductive coupling (also referred to as magnetic coupling in the art) a powered coil (transmitter 24) creates a magnetic field when adjacent to receiver 26 (see arrows in FIG. 3). When transmitter 24 is within a predetermined distance of receiver 26, similarly to a transformer the magnetic field induces electrical current to flow from transmitter 24 through receiver 26. This technology is used in other art fields, for example for charging batteries of electronic devices such as cellular telephones without use of dedicated charger cables, in transformers, in induction loop communication systems, in graphics tablets, in electronic article surveillance tags for theft prevention, and others.

In use, an electrical current is consistently or intermittently supplied to transmitter 24. When transmitter 24 and receiver 26 are not disposed within a predetermined distance of one another (see FIG. 2), the electrical circuit does not complete and no electrical current is supplied to receiver 26. On the other hand, when transmitter 24 and receiver 26 are disposed within a predetermined distance of one another (see FIG. 4), the magnetic field created (see arrows in FIG. 3) supplies an electrical current to receiver 26. In this configuration, electrical current is then passed from receiver 26 to light source 28.

Conveniently, in the depicted embodiment receiver 26 is disposed in a pivoting hinge wing 17, and so any wiring for supplying electrical current to light source 28 is routed entirely in or on lid 14 and so will not interfere with or be pinched during the movement of pivoting hinge 16. In turn, transmitter 24 is disposed in the pivoting hinge knuckle 18, and so any wiring for supplying electrical current to transmitter 24 is routed entirely in or on storage compartment 12 and so is not interfered with be pinched by the movement of pivoting hinge 16. Thus, when the hinged lid 14 is displaced from a closed to an open configuration (see arrows in FIG. 4), transmitter 24 is concurrently displaced from a spaced-apart to an adjacent position relative to receiver 26. In the spaced-apart configuration between transmitter 24 and receiver 26 provided by displacing lid 14 to the closed configuration (FIG. 2), transmitter 24 and receiver 26 are sufficiently far apart that no electrical current is supplied to receiver 26 and therethrough to light source 28. However, as lid 14 is displaced to an open configuration (FIG. 4), transmitter 24 and receiver 26 are positioned adjacent to one another whereby current passes from transmitter 24 to receiver 26 (FIG. 3), and electrical current is supplied to light source 28.

In the disclosed embodiment, transmitter 24 and receiver 26 are oriented such that their longitudinal planes are substantially parallel one to the other. However, it will be appreciated that the orientation of the transmitter 24 and receiver 26 could be altered without altering the above-described operation, for example by rotating the transmitter 24 and receiver 26 90 degrees such that a longitudinal plane of each is substantially coplanar with a longitudinal axis of the hinged lid 14.

Typically, current is supplied to transmitter 24 from the motor vehicle electrical system in a pulsatile fashion rather than constantly. That is, an electrical current may be pulsed to transmitter 24 at predetermined spaced-apart time intervals, for example every 2 seconds. If lid 14 is in the closed configuration of FIG. 2, transmitter 24 will not be adjacent to receiver 26 and no current will be supplied to light source 28. If lid 14 is in the open configuration of FIG. 4, transmitter 24 will be adjacent to receiver 26 and current will be supplied to light source 28. It will be appreciated that transmitter 24/receiver 26 combinations may be selected allowing predetermining a distance between the elements that will allow electrical current to pass therebetween. For example, the skilled artisan would readily be able to select transmitter 24/receiver 26 combinations which require the two to be 5 mm or less apart from one another before an electrical circuit could be established.

Numerous advantages accrue from the above-described lighting system for an automotive storage bin. For example, the system eliminates any wiring or moving electronics across the hinge 16 elements, reducing risk of damage and also eliminating any need for costly moving electronics. By this feature alone, significant cost savings are realized. In turn, the described mechanism is durable, as the componentry will last a significant time without incurring wear and tear. Indeed, the parts of the storage compartment will likely wear out before the electronics used to supply current to light source 28. Moreover, the described system is highly tolerant of misalignment, and so an extremely precise mechanism is not required. Still more, additional savings are realized by not having to provide a switch or other mechanism to actuate light source 28—all the user has to do is open lid 14 of the storage compartment and light 28 will automatically be actuated.

Obvious modifications and variations are possible in light of the above teachings. For example, the above description is directed to an interior lighting system for a motor vehicle console having a storage compartment. However, the skilled artisan will appreciate that the system may be adapted to any motor vehicle storage compartment having a hinged lid, and requiring interior lighting for motor vehicle operator or passenger convenience. All such modifications and variations are within the scope of the appended claims when interpreted in accordance with the breadth to which they are fairly, legally and equitably entitled.

What is claimed:

1. A storage bin for a motor vehicle, comprising:
a storage bin storage compartment;
a storage bin lid hingedly connected to the storage compartment, the lid including a light source disposed to illuminate an interior of the storage compartment; and
a transmitter and a receiver for providing an electrical current to the hinged storage bin light source allowing actuation of the hinged storage bin light source based on the proximity of the transmitter to the receiver.

2. The storage bin of claim 1, wherein the transmitter is a first coil disposed in a first portion of a pivoting hinge assembly of the storage bin and the receiver is a second coil disposed in a second portion of the pivoting hinge assembly, the second coil electrically communicating with the light source.

3. The storage bin of claim 2, wherein a current is supplied to the light source when the transmitter and receiver are disposed adjacent to one another by pivoting the storage bin lid to an open configuration.

4. The storage bin of claim 3, wherein the current is supplied to the light source by an inductive coupling process when the storage bin lid is pivoted to place the transmitter and receiver adjacent to one another.

5. The storage bin of claim 4, wherein the current is supplied to the light source when the transmitter and receiver are placed up to 5 mm one from the other.

6. The storage bin of claim 1, wherein an electrical current pulse is automatically provided to the transmitter at a predetermined time interval regardless of an orientation of the storage bin lid.

7. A motor vehicle console including the storage bin of claim 1.

8. A motor vehicle including the console of claim 7.

9. In a motor vehicle storage bin having a storage compartment and a hinged lid, a method for supplying a current to an interior storage bin light, comprising:
providing a transmitter disposed in a first portion of a hinge assembly of the storage bin; and
providing a receiver disposed in a second portion of the hinge assembly of the storage bin;
whereby a current is supplied from the transmitter to the adjacent receiver when the storage bin lid is pivoted from a closed to an open configuration to automatically actuate the interior storage bin light based on the proximity of the transmitter to the receiver.

10. The method of claim 9, wherein the current is supplied by an inductive coupling process by disposing the transmitter adjacent to the receiver by pivoting the storage bin lid to the open configuration.

11. The method of claim 10, wherein the current is supplied from the transmitter to the receiver when the transmitter is disposed up to 5 mm from the receiver by pivoting the storage bin lid to the open configuration.

12. The method of claim 9, including a step of automatically providing an electrical current pulse to the transmitter at a predetermined time interval.

13. A lighted console subassembly for a motor vehicle, comprising:
a storage bin storage compartment;
a storage bin lid hingedly connected to the storage compartment, the lid comprising an exterior armrest assembly and a light source disposed to illuminate an interior of the storage compartment; and
a transmitter and receiver for providing an electrical current to the hinged storage bin light source such that the hinged storage bin light source is automatically actuated based on the proximity of the transmitter to the receiver.

14. The console subassembly of claim 13, wherein the transmitter is a first coil disposed in a first portion of a pivoting hinge assembly of the storage bin and the receiver is a second coil disposed in a second portion of the pivoting hinge assembly, the second coil electrically communicating with the light source.

15. The console subassembly of claim 14, wherein a current is supplied to the light source when the transmitter and receiver are disposed adjacent to one another by pivoting the storage bin lid to an open configuration.

16. The console subassembly of claim 15, wherein the current is supplied to the light source by an inductive coupling process when the storage bin lid is pivoted to place the transmitter and receiver adjacent to one another.

17. The console subassembly of claim 16, wherein the current is supplied to the light source when the transmitter and receiver are placed up to 5 mm one from the other.

18. The console subassembly of claim 13, wherein an electrical current pulse is automatically provided to the transmitter at a predetermined time interval.

19. A motor vehicle including the console subassembly of claim 13.

* * * * *